United States Patent
Kirca et al.

(10) Patent No.: US 10,941,831 B2
(45) Date of Patent: Mar. 9, 2021

(54) MODULAR SHOCK ABSORBER STRUCTURE

(71) Applicant: ISTANBUL TEKNIK UNIVERSITESI, Istanbul (TR)

(72) Inventors: Mesut Kirca, Istanbul (TR); Cem Guzelbulut, Kahramanmaras (TR); Ezgi Akbulut, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 18 days.

(21) Appl. No.: 16/612,415

(22) PCT Filed: May 18, 2018

(86) PCT No.: PCT/TR2018/050249
§ 371 (c)(1),
(2) Date: Nov. 11, 2019

(87) PCT Pub. No.: WO2019/032070
PCT Pub. Date: Feb. 14, 2019

(65) Prior Publication Data
US 2020/0063819 A1    Feb. 27, 2020

(30) Foreign Application Priority Data

May 22, 2017    (TR) .................. 2017/07444

(51) Int. Cl.
| F16F 7/12 | (2006.01) |
| F16F 13/02 | (2006.01) |
| F16F 7/08 | (2006.01) |

(52) U.S. Cl.
CPC ............... *F16F 13/02* (2013.01); *F16F 7/08* (2013.01); *F16F 7/12* (2013.01)

(58) Field of Classification Search
CPC ...... F16F 7/08; F16F 7/12; F16F 7/121; F16F 13/02
See application file for complete search history.

(56) References Cited

U.S. PATENT DOCUMENTS

| 7,160,621 | B2 | 1/2007 | Chaudhari et al. |
| 7,195,210 | B2 * | 3/2007 | Hamilton .................. B64C 3/46 244/219 |
| 9,494,206 | B2 * | 11/2016 | Rajasekaran ........... F16F 3/093 |
| 9,629,397 | B2 * | 4/2017 | Toronjo .................... A42B 1/22 |
| 9,936,755 | B2 * | 4/2018 | Blakely .................. A41D 31/04 |
| 9,995,359 | B2 * | 6/2018 | Martino Gonzalez .... F16F 7/12 |
| 10,426,226 | B2 * | 10/2019 | Guyan ................. A43B 23/028 |
| 10,537,758 | B2 * | 1/2020 | Comet .................... A62B 35/04 |
| 10,808,794 | B1 * | 10/2020 | Boyce ....................... F16F 7/08 |
| 10,878,791 | B2 * | 12/2020 | Martino Gonzalez .... B32B 3/12 |

(Continued)

FOREIGN PATENT DOCUMENTS

WO    2004104315 A1    12/2004

*Primary Examiner* — Thomas W Irvin
(74) *Attorney, Agent, or Firm* — Bayramoglu Law Offices LLC

(57) ABSTRACT

A modular shock absorber developed for use in places where shock absorption is required. The modular shock absorber includes; horizontal carriers, a main carrier I and a main carrier II, a central carrier I, a central carrier II, an upper plate I, a lower plate I, a lower plate II, an upper plate II, an upper plate III, a lower plate III, a lower plate IV and an upper plate IV.

2 Claims, 4 Drawing Sheets

(56) References Cited

U.S. PATENT DOCUMENTS

| | | | |
|---|---|---|---|
| 2004/0069907 A1* | 4/2004 | Dockter | B64C 3/54 |
| | | | 244/218 |
| 2005/0056731 A1* | 3/2005 | Hamilton | B64C 3/38 |
| | | | 244/219 |
| 2006/0129227 A1* | 6/2006 | Hengelmolen | A61F 2/915 |
| | | | 623/1.16 |
| 2007/0012535 A1 | 1/2007 | Matheny | |
| 2012/0125726 A1 | 5/2012 | Langhorst et al. | |
| 2013/0264757 A1* | 10/2013 | Rajasekaran | F16F 7/00 |
| | | | 267/141 |
| 2014/0017422 A1 | 1/2014 | Ma | |
| 2016/0169312 A1 | 6/2016 | Tsai | |
| 2017/0051806 A1* | 2/2017 | Kang | B33Y 10/00 |
| 2018/0178047 A1* | 6/2018 | Comet | A44B 18/0084 |
| 2020/0023721 A1* | 1/2020 | Kobayashi | B60J 5/0461 |

* cited by examiner

MODULAR SHOCK ABSORBER STRUCTURE

CROSS REFERENCE TO THE RELATED APPLICATIONS

This application is the national phase entry of International Application No. PCT/TR2018/050249, filed on May 18, 2018, which is based upon and claims priority to Turkish Patent Application No. 2017/07444, filed on May 22, 2017, the entire contents of which are incorporated herein by reference.

TECHNICAL FIELD

The invention is related to a modular shock absorber developed for use in places where shock absorption is required.

The invention is more specifically related to a modular shock absorber structure which is formed of plates that are placed in succession as being parallel and inclined and by main carriers which carry inclined plates having zigzag shape.

BACKGROUND

A structure changes form and becomes damaged under shock or load. The damage and permanent deformation of the structure is something undesired and various improvements have been made in the technique to prevent/mitigate damages on the structure by distributing the shock or load on the structure.

The US patent document US2012125726 of the prior art describes a dissipative structure which includes at least one panel and a cell structure disposed adjacent to the at least one panel having interconnected cells. It is configured to dissipate the force when facing the force and comprises hydro gel in the cells. The fibers merged in the invention comprise fibers which are directed in inclined angles to each other. In another application of the invention, the structure consists of a material layer with many holes created in the wall element. It consists of an impermeable material (composite material, polymer, metal, metal alloy etc.) with holes created in different forms processed on the layer.

The US patent U.S. Pat. No. 7,160,621 of the prior art describes an energy absorbing article which comprises an auxetic structure used for personal protective equipment or devices that consist of plastic, metal or composite materials. This energy absorbing article has a size greater than 1 mm, and it comprises a zigzag cell form or a plurality of coupled cells placed between one or more outer layers. There are gaps extending between the coupled cells. When the structure is exposed to transversal compression, it exhibits a longitudinal contraction. And a transversal contraction occurs when it is exposed to a longitudinal compression.

The international patent document WO2004104315 in the previous art describes an auxetic structure. This structure, which comprises zigzag form of webs with cavities, can be merged for obtaining bigger structures. When vertical load is applied on the structure, the structure flexes laterally. This flexion comprises zigzag form of webs.

In the previous art, the US patent document US2014017422 describes a structure with NPR (negative poisson's ratio) structures developed for vehicles and other applications. The structure is composed of a plurality of nested, double-V unit cells which change form against the force which may be received in lateral or vertical direction.

The documents shown as example mention a structure with cavity, and these structures change form against force and dissipate force. However, none of the structures in these documents take into account the friction force. However, more loads may be carried with friction to occur on the structure under the load, and the resistance of the structure can be increased. The lack of an absorber structure which creates a friction force with the plates the structure has under load, and enables spring action of the structure with zigzag carriers necessitated the development of the invented modular shock absorber structure.

SUMMARY

The objective of this invention is to provide a modular shock absorber structure which is formed of plates that are placed in succession as being parallel and inclined and by main carriers which carry inclined plates having zig-zag shape.

Another objective of the invention is to provide the modular shock absorber which offers structural alternatives by installing and removing/replacing the structures in the damaged zone like a puzzle.

Another objective of the invention is to provide a modular shock absorber structure with the feature of entrapping high energy thanks to its structure with cavity.

The structure comprises a modular shock absorber structure which is formed of plates that are placed in succession as being parallel and inclined and by main carriers which carry said plates having zig-zag shape. The adjacent plates contact each other when the structure begins changing for under load. This contact activates the friction and bending mechanisms of the structure. As the loading continues, these structures approach each other and intensify thanks to the activated mechanisms. Although certain elements of the structure are partially broken and permanently change form, the structure maintains its property of load bearing as a result of the hierarchical order.

BRIEF DESCRIPTION OF THE DRAWINGS

The modular shock absorbing structure which is provided to achieve the objective of this invention is shown on the annexed figures.

These figures are.

Figure 1:
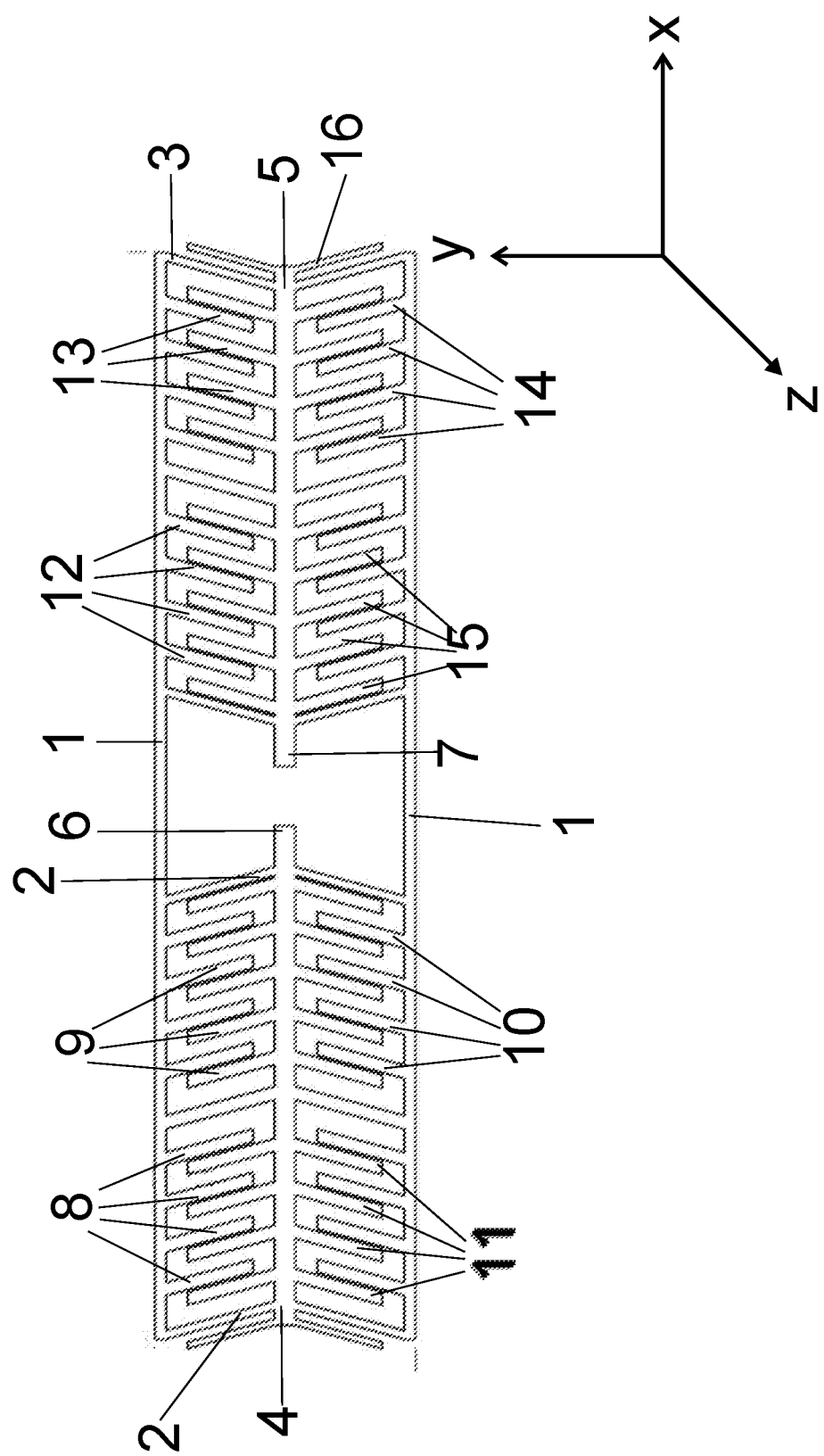
FIG. 1 shows the front elevation of the invented modular shock absorber.
Figure 2:
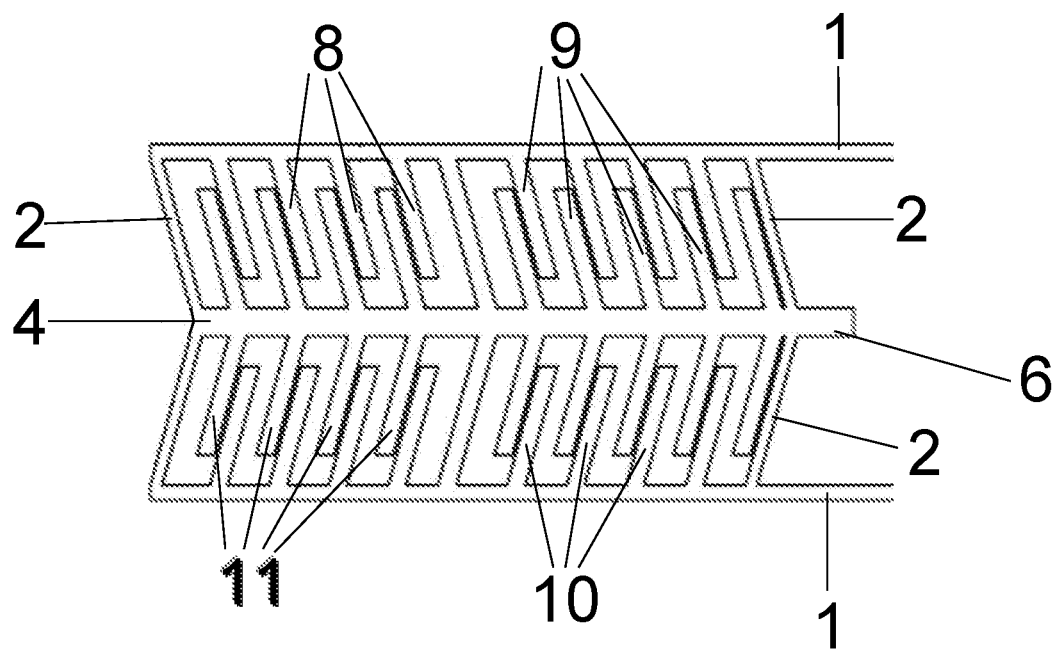
FIG. 2 shows the front elevation of the section where the main carrier I of the invented modular shock absorber structure is located.
Figure 3:
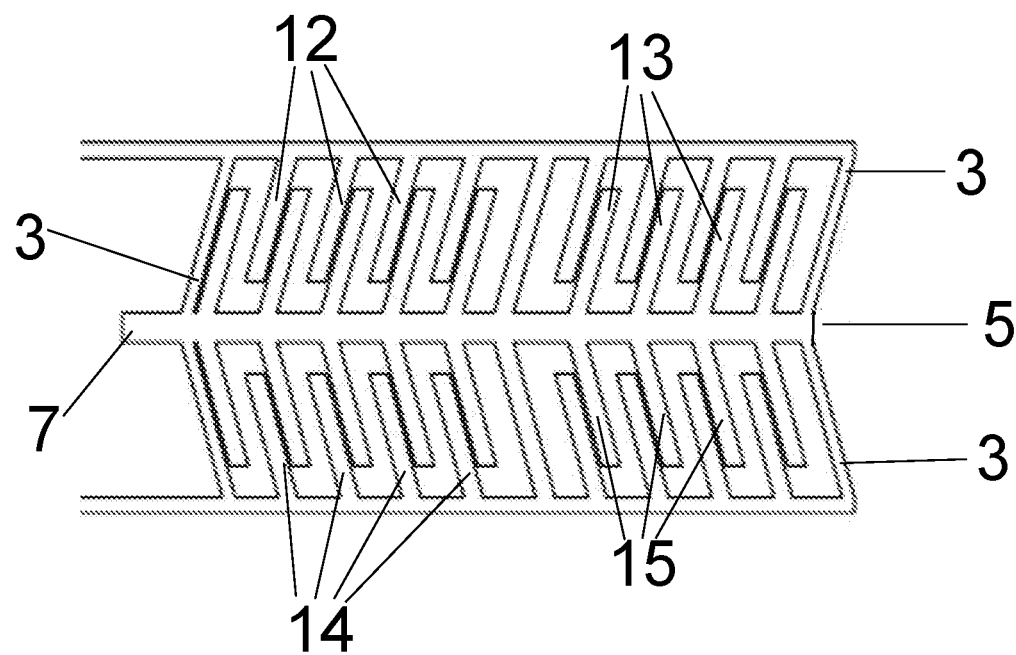
FIG. 3 shows the front elevation of the section where the main carrier II of the invented modular shock absorber structure is located.
Figure 4:
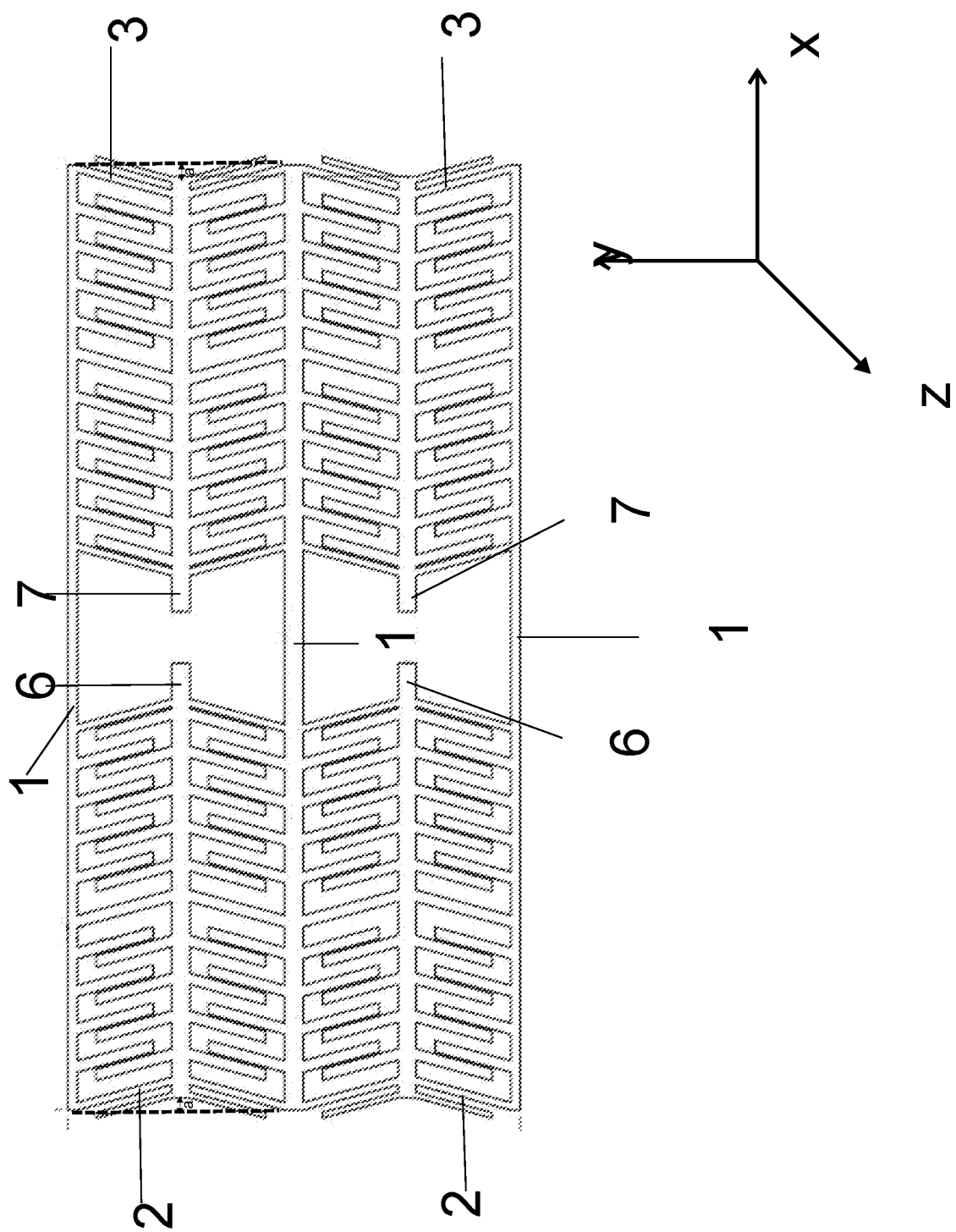
FIG. 4 shows the front elevation of a 2-story application of the invented modular shock absorber.

The parts on the figures have been numbered one by one, and these numbers refer to the following items:

1. Horizontal carrier
2. Main carrier I
3. Main carrier II
4. Main carrier I peak point
5. Main carrier II peak point
6. Central carrier I
7. Central carrier II
8. Upper plate I 9. Lower plate I
10. Lower plate II
11. Upper plate II
12. Upper plate III
13. Lower plate III
14. Lower plate IV
15. Upper plate IV
16. Connection element

DETAILED DESCRIPTION OF THE EMBODIMENTS

The invention is a modular shock absorber wherein it comprises;
horizontal carriers (1) which are positioned one under the other being parallel to each other,
a main carrier I (2) and main carrier II (3) in zigzag form with opposite peak points (4 and 5) which couple horizontal carriers (1) to each other,
a central carrier I (6) which is connected to the peak point (4) of the main carrier I (2) and extends parallel to the horizontal carrier (1),
a central carrier II (7) which is connected to the peak point (5) of the main carrier II (3) and extends parallel to the horizontal carrier (1),
an upper plate I (8) which extends with one end connected to the bottom of the horizontal carrier (1) and with the other end extending free; and which is curved between the horizontal carrier (1) and the central carrier I (6),
a lower plate I (9) which extends with one end connected to the top of the central carrier (1) and with the other end extending free; and which is curved between the horizontal carrier (1) and the central carrier I (6), and which is parallel to the upper plate I (8) and lower plate I (9) which contacts the upper plate I (8),
a lower plate II (10) symmetrical to the lower plate I (9) in its horizontal axis, which extends with one end connected to the top of the horizontal carrier (1) and with the other end extending free; and which is curved between the horizontal carrier (1) and the central carrier I (6),
an upper plate II (11) which extends with one end connected to the bottom of the central carrier I (6) and with the other end extending free; and which is curved between the horizontal carrier (1) and the central carrier I (6), and which is symmetrical to the upper plate I (8) and lower plate II (10), and which contacts the lower plate II (10),
an upper plate III (12) parallel to the upper plate II (11), which extends with one end connected to the bottom of the horizontal carrier (1) and with the other end extending free; and which is curved between the horizontal carrier (1) and the central carrier II (7),
a lower plate III (13) which extends with one end connected to the top of the central carrier II (7) and with the other end extending free; and which is curved between the horizontal carrier (1) and the central carrier II (7), and which is parallel to the upper plate III (12) and which contacts the upper plate III (12),
lower plate IV (14) symmetrical to the lower plate III (13) in its horizontal axis, which extends with one end connected to the top of the horizontal carrier (1) and with the other end extending free; and which is curved between the horizontal carrier (1) and the central carrier II (7),
an upper plate IV (15) which extends with one end connected to the bottom of the central carrier II (7) and with the other end extending free; and which is curved between the horizontal carrier (1) and the central carrier II (7), and which is symmetrical to the upper plate III (12) in its lateral axis, and parallel to the lower plate IV (14), and which contacts the lower plate IV (14).

The invention is a modular shock absorber structure which comprises a coupling element (16) that enables merging shock absorber structures and which is mounted on the main carrier I (2) and main carrier II (3) in zigzag form.

The upper plate I (8) and the lower plate I (9) contact each other when they are exposed to load in vertical direction (y axis), and a friction occurs between them.

The upper plate II (11) and the lower plate II (10) contact each other when they are exposed to load in vertical direction (y axis), and a friction occurs between them.

The upper plate III (12) and the lower plate III (13) contact each other when they are exposed to load in vertical direction (y axis), and a friction occurs between them.

The upper plate IV (15) and the lower plate IV (14) contact each other when they are exposed to load in vertical direction (y axis), and a friction occurs between them.

The peak point (4) of the main carrier I (2), which is exposed to load in vertical direction (y axis) moves in −x direction, while the peak point (5) of the main carrier II (3) moves in +x direction. Because the peak point (4) of the main carrier I (2) and the peak point (5) of the main carrier II (3) are in opposite direction and there is distance between them.

The structure begins changing form when load is applied on the modular shock absorber structure in vertical (y) axis. The structure dissipates the load received in vertical axis (y) equally to the (z) axis which is vertical to the horizontal and vertical axis.

In other words, the curved upper plate I (8) and lower plate I (9) and the upper plate II (11) and the lower plate II (10) contact each other under load, they concentrate and create friction. They conduct the applied load at −x axis due to the curve they have. The central carrier I (6) which is connected to the main carrier I's (2) peak point (4) and extends parallel to the horizontal carrier (1) during the load applied in vertical direction, also dissipates the applied load in −x direction. In that case, the main carrier I (2) acts like a spring under the load and bends. During bending, the main carrier I (2) peak point (4) moves in +x direction.

The curved upper plate III (12) and lower plate III (13) and the upper plate IV (15) and the lower plate IV (14) contact each other under load, they concentrate and create friction. They conduct the applied load at +x axis due to the curve they have. The central carrier I (7) which is connected to the main carrier I's (3) peak point (5) and extends parallel to the horizontal carrier (1) during the load applied in vertical direction, dissipates the applied load in +x direction. In that case, the main carrier I (3) acts like a spring under the load and bends. During bending, the main carrier II (3) peak point (5) moves in −x direction.

The shock absorber structure can bear load for a long time without being damaged due to the friction and the spring like action and bending of the main carrier I (2) and main carrier II (3) in opposite directions.

During the period of deforming, the structure maintains the property of load bearing thanks to the hierarchical order although certain elements of the upper plate I (8) and the lower plate I (9), the upper plate II (11) and the lower plate II (10), the upper plate III (12) and the lower plate III (13), the upper plate IV (15) and the lower plate IV (14) are permanently deformed and partially broken.

Figure 5:
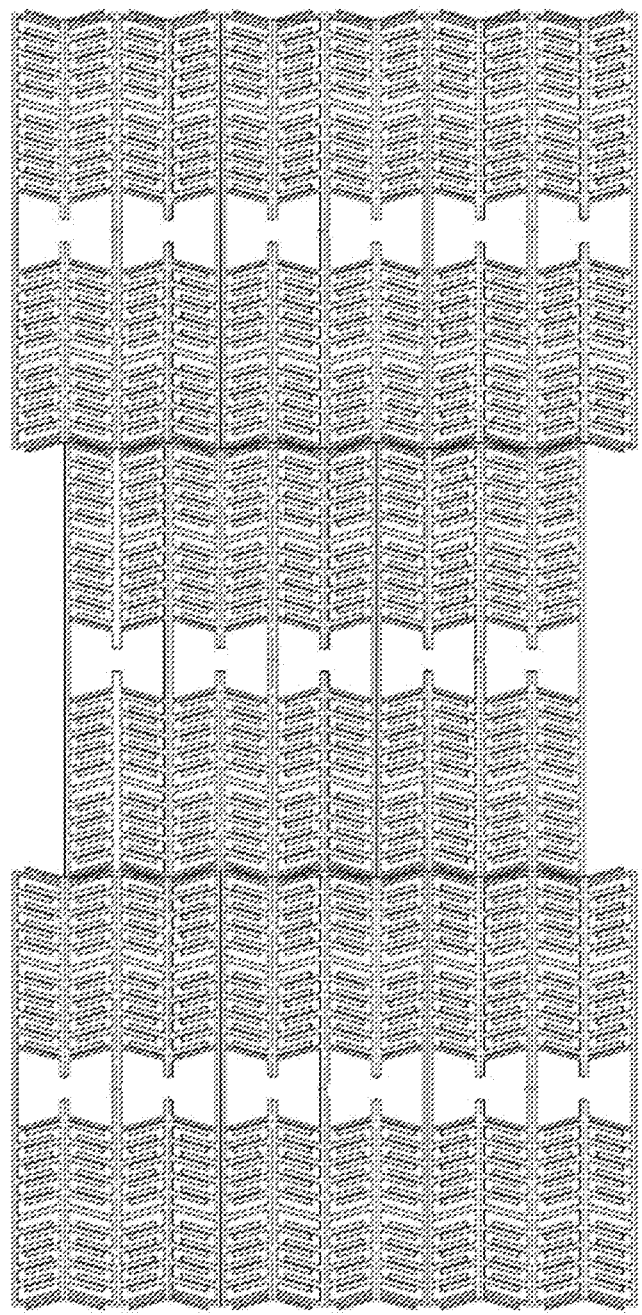
FIG. 5 shows the front elevation of the shock absorber structure after coupling several shock absorber structures.

Bigger structures can be obtained by merging the modular shock absorber structure with other shock absorber structures through the coupling element (8) it has. (FIG. 5)

The invention has been developed for use in the areas that require shock absorbing in general. For example, it can be used in the buffer area, sides and doors to protect a vehicle in automotive industry. It can also be used in defense industry, for the outer body of armored vehicles, protective vests, helmets, knee protectors etc. Or as a surface coating for marine vessels to prevent the damages of shocks caused by waves.

The benefits of the modular shock absorbing structure are:

It has a high load bearing capacity and it can be adjusted.

As it has cavities, it is lighter compared to the conventional materials used.

It can be manufactured with the advanced additive manufacturing method, which has become popular recently. As a result, cheaper production is possible.

The invention can be produced with any materials that can be used by 3D printers. As a result, it allows for using structures with different thicknesses according to the intended use.

As they are modular, the damaged parts/zones can easily be replaced without requiring to change the entire damaged structure, thus offering benefits in terms of both cost and material saving.

What is claimed is:

1. A modular shock absorber, comprising:
a plurality of horizontal carriers positioned one under the other being parallel to each other,
a first main carrier and a second main carrier are provided in a zigzag form with opposite peak points, wherein the zigzag form couples the plurality of horizontal carriers to each other,
a first central carrier is connected to a peak point of the first main carrier and extends parallel to the horizontal carrier,
a second central carrier is connected to a peak point of the second main carrier and extends parallel to the horizontal carrier,
a first upper plate extends with one end connected to a bottom of the horizontal carrier and with an other end extending free; and the first upper plate is curved between the horizontal carrier and the first central carrier,
a first lower plate extends with one end connected to a top of the central carrier and with an other end extending free; and the first lower plate is curved between the horizontal carrier and the first central carrier, and is parallel to the first upper plate and the first lower plate contacts the first upper plate,
a second lower plate is symmetrical to the first lower plate in along a horizontal axis, the second lower plate extends with one end connected to a top of the horizontal carrier and with an other end extending free; and the second lower plate is curved between the horizontal carrier and the first central carrier,
a second upper plate extends with one end connected to a bottom of the first central carrier and with an other end extending free; and the second upper plate is curved between the horizontal carrier and the first central carrier, and the second upper plate is symmetrical to the first upper plate and the second lower plate, wherein the second upper plate contacts the second lower plate,
a third upper plate parallel to the second upper plate, wherein the second upper plate extends with one end connected to a bottom of the horizontal carrier and with an other end extending free; and the third upper plate is curved between the horizontal carrier and the second central carrier,
a third lower plate extends with one end connected to a top of the second central carrier and with an other end extending free; and the third lower plate is curved between the horizontal carrier and the second central carrier, and the third lower plate is parallel to the third upper plate, wherein the third lower plate contacts the third upper plate,
a fourth lower plate is symmetrical to the third lower plate along the in horizontal axis, wherein the fourth lower plate extends with one end connected to the top of the horizontal carrier and with an other end extending free; and the fourth lower plate is curved between the horizontal carrier and the second central carrier,
a fourth upper plate extends with one end connected to a bottom of the second central carrier and with an other end extending free; and the fourth upper plate is curved between the horizontal carrier and the second central carrier, and the fourth upper plate is symmetrical to the third upper plate along a lateral axis, and parallel to the fourth lower plate, and the fourth upper plate contacts the fourth lower plate.

2. The modular shock absorber structure according to claim 1, further comprising a coupling element, for connecting the modular shock absorber structure with an other shock absorber structures and the coupling element is mounted on the first main carrier and the second main carrier in the zigzag form.

* * * * *